United States Patent
Pereira

(10) Patent No.: US 9,313,276 B2
(45) Date of Patent: Apr. 12, 2016

(54) METHOD FOR TRANSMITTING AIRCRAFT FLIGHT DATA

(75) Inventor: Frazer Leslie Pereira, Mumbai (IN)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 696 days.

(21) Appl. No.: 13/585,973

(22) Filed: Aug. 15, 2012

(65) Prior Publication Data

US 2013/0244588 A1 Sep. 19, 2013

(30) Foreign Application Priority Data

Mar. 13, 2012 (IN) ................ 720DEL2012

(51) Int. Cl.
*H04B 7/24* (2006.01)
*H04L 29/08* (2006.01)
*B64D 45/00* (2006.01)

(52) U.S. Cl.
CPC ............. *H04L 67/12* (2013.01); *B64D 45/00* (2013.01); *B64D 2045/0065* (2013.01); *B64D 2045/0085* (2013.01)

(58) Field of Classification Search
CPC .............................. B64D 2045/0065
USPC ................... 455/39, 422
See application file for complete search history.

(56) References Cited

U.S. PATENT DOCUMENTS

| | | | |
|---|---|---|---|
| 6,092,008 A | | 7/2000 | Bateman |
| 6,122,291 A | * | 9/2000 | Robinson et al. ............. 370/468 |
| 6,173,159 B1 | | 1/2001 | Wright et al. |
| 6,385,513 B1 | | 5/2002 | Murray et al. |
| 2003/0225492 A1 | | 12/2003 | Cope et al. |
| 2004/0204801 A1 | | 10/2004 | Steenberge et al. |

OTHER PUBLICATIONS

Search Report from GP Application No. 1304409.4 dated Sep. 13, 2013.
Triggered Transmission of Flight Data Working Group Report, Mar. 18, 2011, Bureau d'Enquetes et d'Analyses, Zone Sud-200 rue de Paris, Aeroport du Bourget, 93352 Le Bourget Cedex-France, www.bea.aero.com, 47 pages.

* cited by examiner

*Primary Examiner* — Hsin-Chun Liao
(74) *Attorney, Agent, or Firm* — GE Global Patent Operation; William S. Munnerlyn

(57) ABSTRACT

A method of transmitting aircraft flight data for an aircraft from the aircraft to a destination server via a wireless communication link with the method including determining an operational status of the aircraft, determining flight data to be transmitted, and transmitting the determined flight data to be transmitted to the destination server.

17 Claims, 4 Drawing Sheets

METHOD FOR TRANSMITTING AIRCRAFT FLIGHT DATA

CROSS-REFERENCE TO RELATED APPLICATIONS

This application claims priority under 35 U.S.C. §119 to Indian Patent Application No. 720DEL2012, filed Mar. 13, 2012, the disclosure of which is incorporated herein by reference.

BACKGROUND OF THE INVENTION

Contemporary aircraft may be equipped with a flight and/or data recording that records information about a flight and which is often referred to as the "black box." Sensors and recorders may be installed in the aircraft and connected to the black box to help reconstruct the events leading to an aircraft accident. For example, the cockpit voice recorder may record radio transmission and sounds in the cockpit, such as the pilot's voices and engine noises. Such sounds may be stored on the black box and from these sounds, parameters such as engine rpm, system failures, speed, and the time at which certain events occur can often be determined. Commercially available black boxes have limited storage and no transmission capability and retrieval of these black boxes may be a problematic in many cases.

BRIEF DESCRIPTION OF THE INVENTION

In one embodiment, a method of transmitting aircraft flight data for an aircraft includes determining an operational status of the aircraft, determining a portion of the flight data to be transmitted based upon the determined operational status of the aircraft, and transmitting the determined portion of the flight data over the wireless communication link.

DETAILED DESCRIPTION OF THE INVENTION

Figure 1:
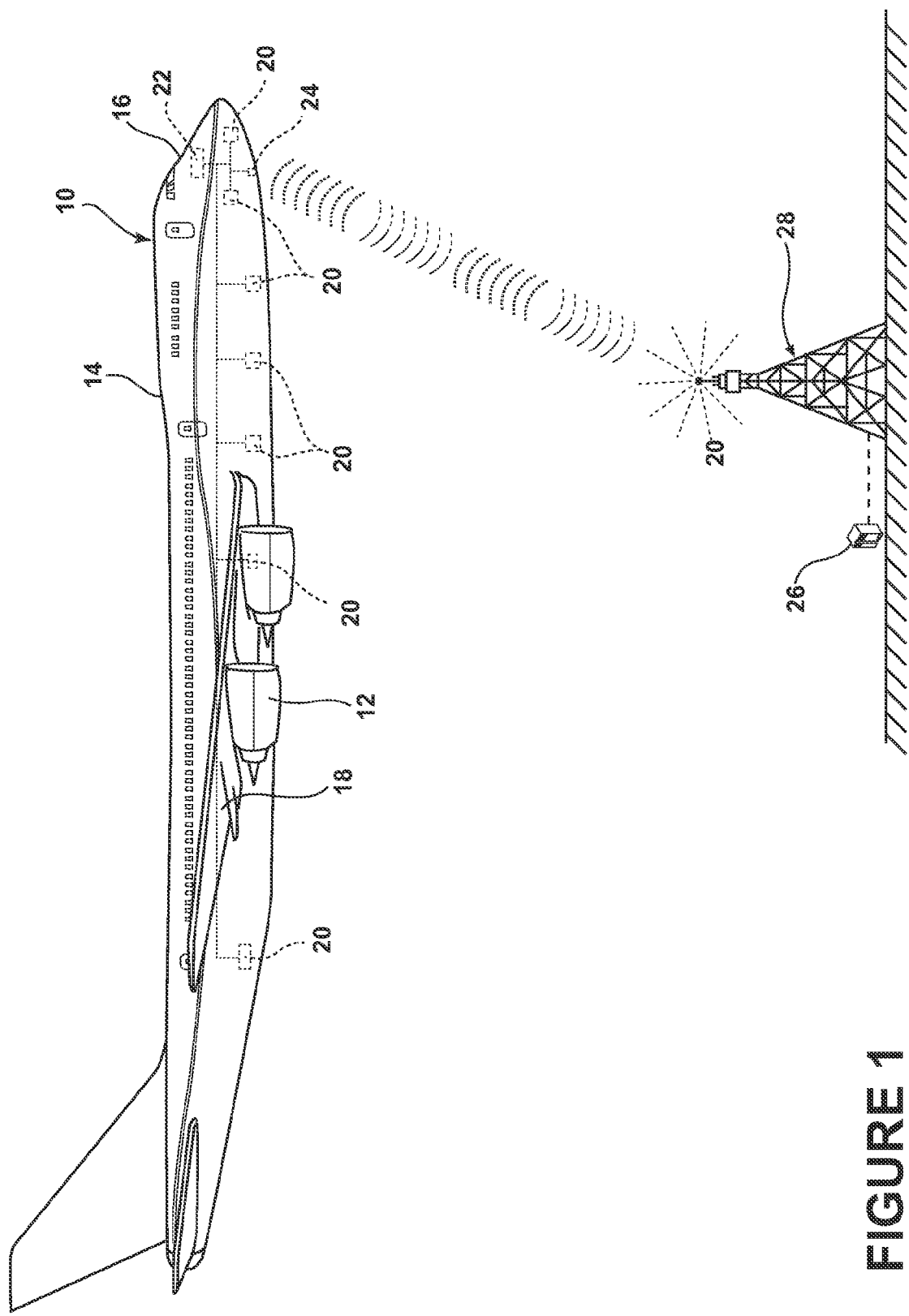
FIG. 1 is a schematic illustration of an aircraft providing one example of an environment in which embodiments of the invention may be executed to transfer information to a destination server.

FIG. 1 depicts an aircraft 10 that may execute embodiments of the invention and may include one or more propulsion engines 12 coupled to a fuselage 14, a cockpit 16 positioned in the fuselage 14, and wing assemblies 18 extending outward from the fuselage 14. Further, a plurality of aircraft systems 20 that enable proper operation of the aircraft 10 may be included as well as a flight control computer 22, and a communication system having a wireless communication link 24. While a commercial aircraft has been illustrated, it is contemplated that embodiments of the invention may be used in any type of legacy aircraft, for example, without limitation, fixed-wing, rotating-wing, rocket, personal aircraft, and military aircraft.

The plurality of aircraft systems 20 may reside within the cockpit 16, within the electronics and equipment bay (not shown), or in other locations throughout the aircraft 10 including that they may be associated with the engines 12. Such aircraft systems 20 may include but are not limited to: an electrical system, an oxygen system, hydraulics and/or pneumatics system, a fuel system, a propulsion system, navigation systems, flight controls, audio/video systems, an Integrated Vehicle Health Management (IVHM) system, and systems associated with the mechanical structure of the aircraft 10. The flight control computer 22, which may include a flight management computer, may among other things automate the tasks of piloting and tracking the flight plan of the aircraft 10. The flight control computer 22 may include or be associated with, any suitable number of individual microprocessors, power supplies, storage devices, interface cards, auto flight systems, flight management computers, and other standard components. The flight control computer 22 may include or cooperate with any number of software programs (e.g., flight management programs) or instructions designed to carry out the various methods, process tasks, calculations, and control/display functions necessary for operation of the aircraft 10. The flight control computer 22 is illustrated as being in communication with the plurality of aircraft systems 20 and it is contemplated that the flight control computer 22 may aid in operating the aircraft systems 20 and may receive information from the aircraft systems 20.

The wireless communication link 24 may be communicably coupled to the flight control computer 22 or other processors of the aircraft to transfer flight data information off the aircraft 10. Such a wireless communication link 24 may be any variety of communication mechanism capable of wirelessly linking with other systems and devices and may include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication is not critical to this invention, and later-developed wireless networks are certainly contemplated as within the scope of this invention. Further, the wireless communication link 24 may be communicably coupled with the flight control computer 22 through a wired link without changing the scope of this invention. Although only one wireless communication link 24 has been illustrated it is contemplated that the aircraft 10 may have multiple wireless communication links communicably coupled with the flight control computer 22. Such multiple wireless communication links may provide the aircraft 10 with the ability to transfer flight data information off the aircraft 10 in a variety of ways such as by satellite, GSM, and WiFi.

As illustrated, the flight control computer 22 may communicate with a destination server 26, which may be located at and include a designated ground station 28 via the wireless communication link 24. The ground station 28 may be any type of communicating ground station 28 such as air traffic control. In general, the wireless communication link 24 may have limited bandwidth available for transmitting extensive data from the aircraft 10, and, in any event, it may be costly to communicate large amounts of data via the wireless communication link 24. Although any type of information can be communicated via the wireless communications link 24, embodiments of the invention pertain specifically to communicating aircraft flight data from the aircraft 10 to the ground station 28.

During operation, the flight control computer 22 may receive information from the aircraft systems 20. The flight control computer 22 may execute a program for transmitting aircraft flight data from the aircraft 10 to the ground station 28. It is contemplated that such a process may be user initiated or may be implemented automatically by the flight control computer 22 when the aircraft 10 is in flight. In the case where the transmission of flight data is user initiated, the flight crew may manually initiate the transmission of flight data through a user interface (not shown), which may send a signal regarding same to the flight control computer 22 and the flight computer 22 may then initiate the process and send flight data via the wireless communications link 24.

Figure 2:
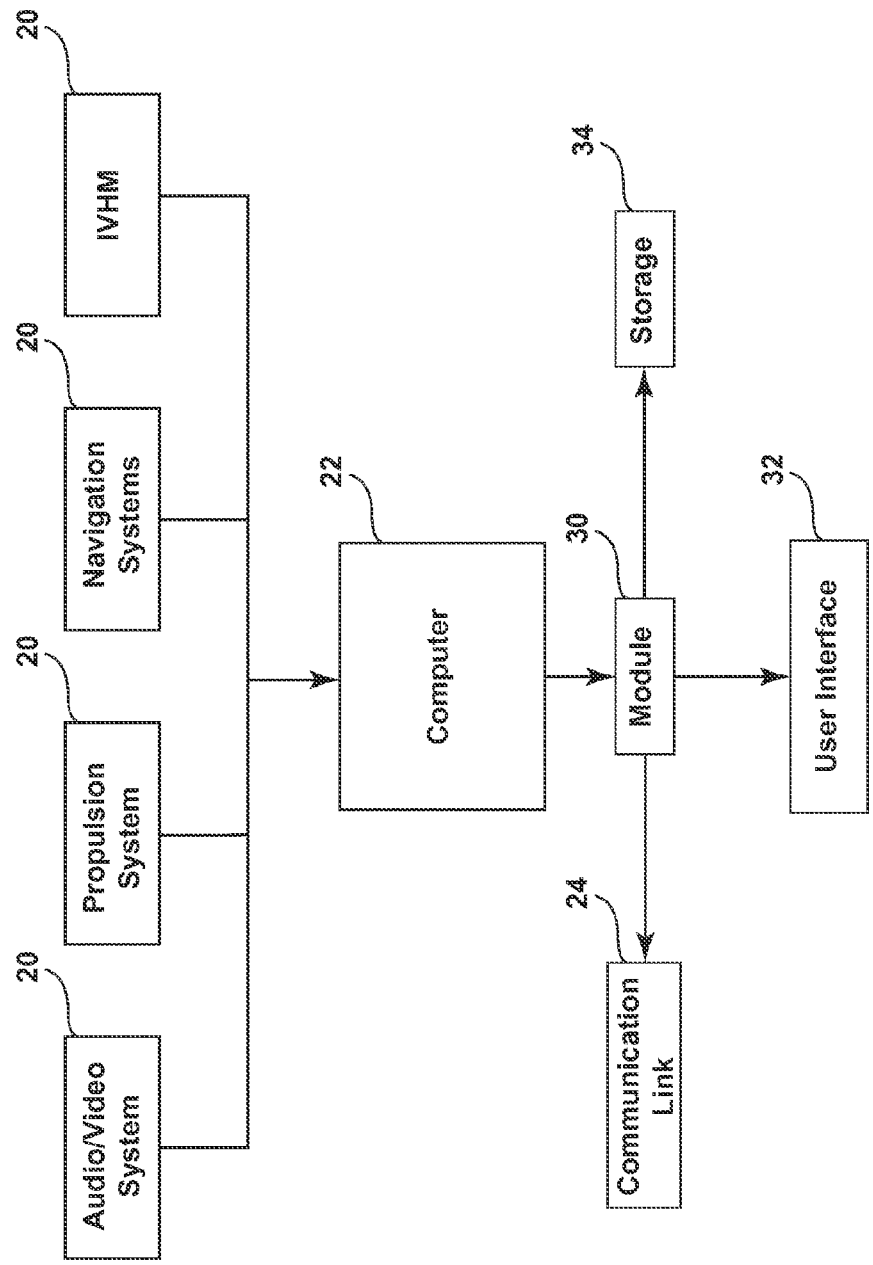
FIG. 2 is a diagram illustrating a system that may be included in the aircraft of FIG. 1 and provides another example of an environment in which embodiments of the invention may be executed.

Alternatively, a separate module or computer may execute a program for transmitting aircraft flight data from the aircraft 10 to the ground station 28. For example, FIG. 2 illustrates a separate transmission module 30. The transmission module 30 might include a general purpose computing device in the form of a computer, including a processing unit, a system memory, and a system bus, that couples various system components including the system memory to the processing unit. The system memory may include read only memory (ROM) and random access memory (RAM). Such a transmission module 30 may communicate with the aircraft systems 20 directly or via the flight control computer 22. A variety of aircraft systems 20 have been illustrated for exemplary purposes and it will be understood that they are only a few of the systems that may be included in the aircraft 10. The transmission module 30 may be operably coupled to the wireless communication link 24. Further, it is contemplated that the transmission module 30 may be operably coupled to a user interface 32, such as a user interface 32 located within the cockpit 16, and an optional storage unit 34, which may be akin to a traditional black box.

During operation, the transmission module 30 may receive information from the aircraft systems 20 either directly or through the flight control computer 22. The transmission module 30 may execute a program for transmitting aircraft flight data from the aircraft 10 to the ground station 28. The same flight data transmitted from the aircraft 10 may also be stored to the storage unit 34.

Regardless of whether the flight control computer 22 or the transmission module 30 runs the program for transmitting the aircraft flight data, the program may include a computer program product that may include machine-readable media for carrying or having machine-executable instructions or data structures stored thereon. Such machine-readable media may be any available media, which can be accessed by a general purpose or special purpose computer or other machine with a processor. Embodiments of the invention will be described in the general context of a method that may be implemented in one embodiment by a program product including machine-executable instructions, such as program code, for example, in the form of program modules. Generally, program modules include routines, programs, objects, components, data structures, algorithms, etc. that have the technical effect of performing particular tasks or implement particular abstract data types. Machine-executable instructions, associated data structures, and program modules represent examples of program code for executing the method disclosed herein. Machine-executable instructions may include, for example, instructions and data, which cause a general purpose computer, special purpose computer, or special purpose processing machine to perform a certain function or group of functions.

Figure 3:
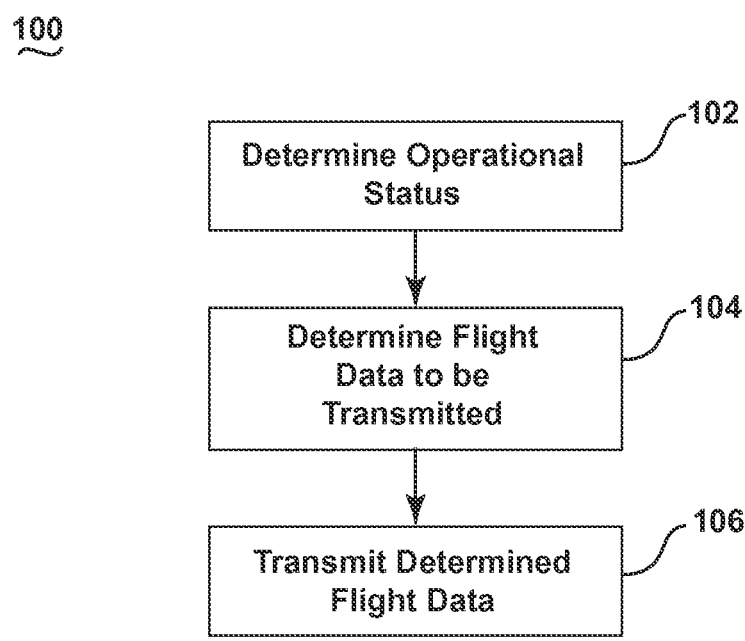
FIG. 3 is a flow chart illustrating a method for transmitting flight data from the aircraft of FIG. 1 according to an embodiment of the invention.

Embodiments of the invention include transmitting aircraft flight data for the aircraft 10 to a destination server 26 via the wireless communication link 24. In accordance with an embodiment of the invention, FIG. 3 illustrates a method 100, which may be used for transmitting aircraft flight data. The method 100 includes determining an operational status of the aircraft at 102, determining a portion of the flight data to be transmitted based upon the determined operational status of the aircraft at 104, and transmitting the determined portion of the flight data to the ground station at 106.

The method begins with determining an operational status of the aircraft 10 at 102. By way of example, the operational status of the aircraft 10 may include a normal mode, an emergency mode, a critical mode, and a customized mode, which may be a user-defined mode. The operational status may be determined by either the flight computer 22 or the transmission module 30 as either may receive inputs from the aircraft systems 20 and may determine an operational status of the aircraft 10 based thereon. Information from the aircraft systems 20 may trigger the various operational statuses of the aircraft 10. The current operational status of the aircraft 10 may be determined by monitoring at least one parameter of the aircraft 10 indicative of the operational status. It is contemplated that the determination of the operational status may be done at predetermined time intervals or continuously to monitor the shift in modes or operational statues during operating of the aircraft 10. For example, the operational status of the aircraft 10 may be repeatedly determined including that the determination may be made during the entire period of the method 100. Thus, any shift in operational status from emergency to critical or emergency to normal, etc. may be monitored and determined.

The following are some examples of information or data from the aircraft systems 20 that may be considered in determining the operational status of the aircraft 10. An electrical system failure, a main or auxiliary generator failure, an electrical or power overload, BUS faults, MEA faults and errors, military systems, low oxygen levels, oxygen system failure or low performance, cabin pressurization faults, hydraulic power pump faults, landing gear faults, actuator faults, shock absorbers, pitch changing mechanism, hydraulic or pneumatic pressure loss, low fuel, loss of fuel, possible fire, fuel system error, unequal consumption of fuel, engine failure, engine fault, engine fire, debris hit information, propeller icing information, navigation system failure, brownout, predicted collision, safety hazard detection, turbulence detection, spin or roll detection, flight control failure, computer glitches, throttle jam, control surface jam, autopilot faults, transmission system failure, military information such as being under attack, structural faults, icing, mechanical system failures, etc.

As any combination of such information may be assessed at any one time to determine the operational status of the aircraft it will be understood that the aircraft systems 20 and information therefrom may have an associated priority level, threshold value, tolerance value, and intensity value to aid in determining the operational status of the aircraft 10. The associated priority level may define the impact of the subsystem fault on the operational status of the overall aircraft 10. For example, engine failure may have a higher priority than a low oxygen level. Such priorities may be predetermined and may be customizable by the pilot or aircraft technicians. As an example, the levels assigned may be 1, 3, 5, 7, and 11 with 11 being the highest.

The threshold and tolerance values for determining such aircraft modes may be customized for the type of aircraft and mission of flight. The threshold may be any predetermined value for indicating the operational status of the aircraft system 20. The tolerance value may define a range above and below the threshold where the system may reside but would not always define a problem. The intensity value may indicate how much the threshold has been crossed and how fast it was crossed. A higher intensity may correlate to a higher chance of a critical mode. Such a tolerance value may not be applicable to all of the aircraft system 20. A combination of the threshold value, tolerance value, and intensity value may provide a value to determine the status of the particular aircraft system 20. An overall combination of the statuses of the aircraft systems 20 may determine the operational status and thus the mode of the aircraft 10. By way of example, case based reasoning and statistical approaches may be used to determine the shift in operational modes.

The normal mode, emergency mode, and critical mode may differ in the content of the flight data sent to the ground station 28. Transmission of selective information under a normal mode may be used for derivative statistics, diagnosis and prognosis. Transmission of selective information under an emergency mode may be used for determining system failures, repair, prognosis, and the time at which certain events occurred. Transmission of selective information under a critical mode may be used for determining system failures, location, and the time at which certain events occurred. Thus, at 104 it may be determined what flight data is to be transmitted. The flight data of the aircraft 10 may include for example, navigation data, fuel data, audio data, multimedia data, electrical and power systems data, propulsion data or data related to one of the other aircraft systems 20 including the electrical system, the oxygen system, the hydraulics and/or pneumatics system, flight controls, IVHM, etc.

By way of non-limiting example, if it is determined at 102 that the aircraft is in a normal mode then the determined portion of the flight data to be transmitted may include fuel data and navigation data. Further, in a normal mode audio data such as the pilot's transcript may not be transmitted. By way of non-limiting example, if it is determined at 102 that the aircraft is in an emergency mode or a critical mode then the determined portion of the flight data to be transmitted may include audio data or multimedia data that may include video and other formats. Such audio data or multimedia data may be of particular importance in determining what occurred on the aircraft 10. Further, at 104 it may be determined that in critical mode the portion of the flight data to be transmitted also includes navigation data. By way of non-limiting example, if it is determined at 102 that the aircraft is in an emergency mode then the determined portion of the flight data to be transmitted may include electrical data and/or propulsion data.

Data transmitted during normal mode may include, but is not limited to, fuel, health status of aircraft systems, which may be derived from the IVHM, navigation information including speed and expected ETA. It will be understood that both the volume and content of the flight data over time may vary when the operational status of the aircraft is normal. Data transmitted during emergency mode may include, but is not limited to, Navigational information, pilot transcript and the information regarding the aircraft system which caused the transition from normal mode to emergency mode. Data transmitted during critical mode may include, but is not limited to, navigation information, predicted trajectory, crew/passenger information, cockpit/pilot transcript and information regarding the aircraft system which caused the transition from emergency to critical mode. The content, volume, and the order of such information being sent may also change for the emergency mode and the critical mode. It will be understood that as each operational mode will have a different subset of priority values for the data, the volume and type of data to be transmitted may be different in the various modes.

At 106, the flight data determined at 104 may be transmitted to a destination server 26 such as the located at the ground station 28. The ground station 28 may include a designated ground station. Alternatively, the flight control computer 22 or the transmission module 30 may be capable of searching for a destination server in the surrounding space such as other aircrafts flying in the vicinity, any ground stations located below, or satellites located above. It is contemplated that the flight control computer 22 or the transmission module 30 may have a selection feature so that data is not transferred to an undesired location. At this point, the flight data determined at 104 may also be stored by the flight control computer 22 or the transmission module 30 on the optional storage unit 34.

It will be understood that the method of transmitting aircraft flight data is flexible and that the method 100 illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from the embodiment of the invention. Alternatively, the operational status of the aircraft may be user-defined and such a user-defined status may be determined at 102.

By way of example, the customized mode may be used for survey aircrafts and military missions wherein the aircraft would begin the transfer of specific information over a dedicated channel, as defined by the pilot. For example, the customized mode may be used for a surveillance mission of a UAV over a specific area of interest. In another example, the pilot may enable transfer via the user interface over a specific segment of the flight.

Figure 4:
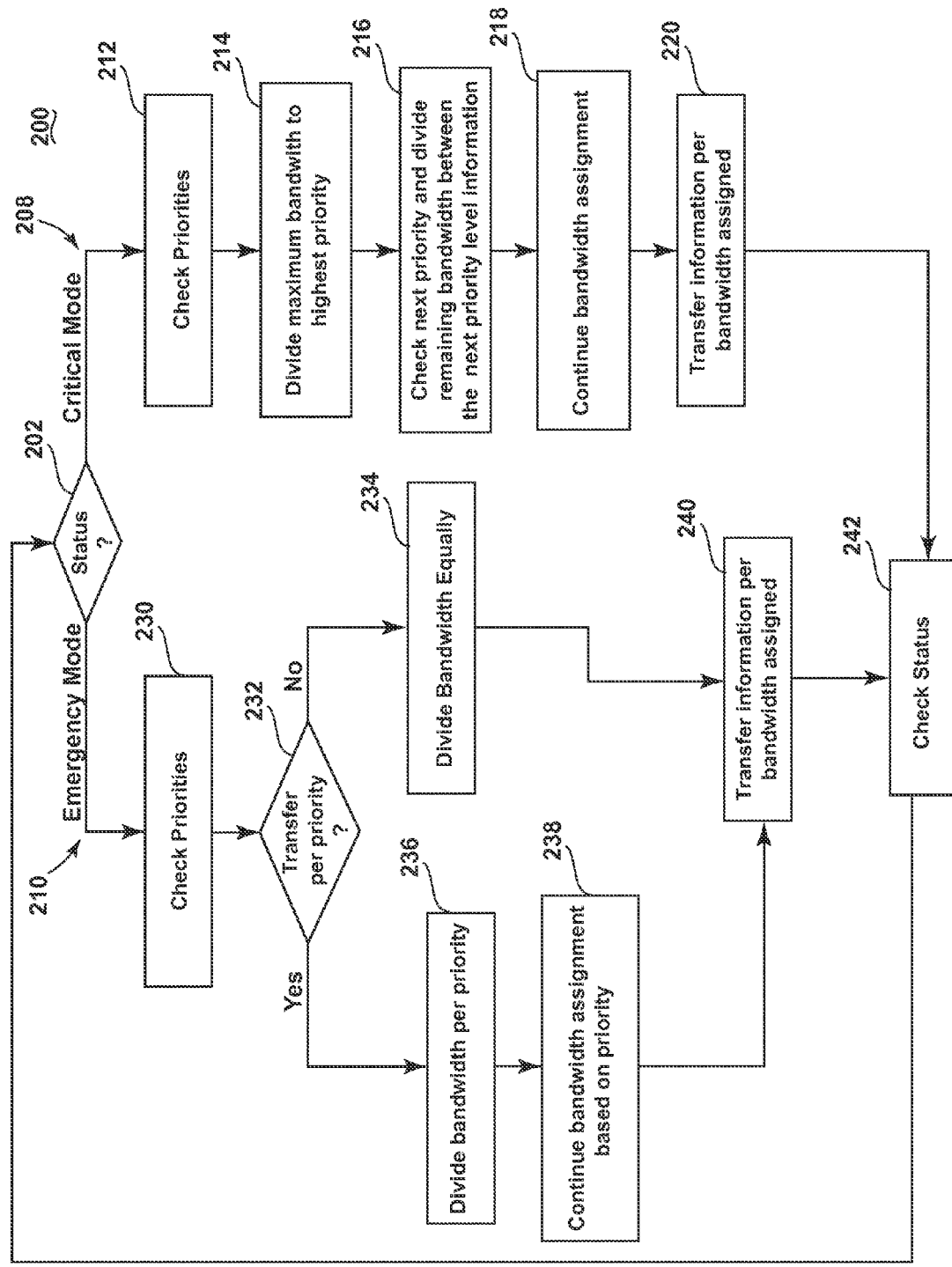
FIG. 4 is a flow chart illustrating a method for transmitting flight data from the aircraft of FIG. 1 according to a second embodiment of the invention.

FIG. 4 illustrates a method 200 for transmitting flight data from the aircraft according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. As with the first embodiment the operational status is determined at 202. For illustrative purposes the method 200 is only illustrated as showing what occurs when it is determined that aircraft is in a critical mode 208 and an emergency mode 210. The second embodiment illustrates that the determination of flight data to be sent may be based on priority of the data during that particular operational status.

If it is determined at 202 that the aircraft is in a critical mode 208, then the method 200 moves on to determining the portion of the flight data to be transmitted and such a determination is based upon to the priority level associated with the flight data. It will be understood that when it is determined that the aircraft 10 has shifted into critical mode 208 the bandwidth assignment for the data to be transmitted may be done as per priority assigned to information. As an example, the priority levels assigned to the flight data may be 1, 3, 5, 7, and 11 with 11 being the highest. Such priorities may be predetermined and may be customizable by the pilot or aircraft technicians. Further, a pilot may have control over which information is to be transmitted and may deselect unrequired information on a user interface in the cockpit 16. Thus, at 212 the priorities assigned to the flight data during the critical status mode may be checked. The information priorities may be changed depending on the operational status of the aircraft. For example, fuel information that may be transmitted in a normal operational status of the aircraft may have an assigned priority level of 3 during the critical mode 208. On the other hand audio and video data from the cockpit may have a priority of 11 assigned to it during the critical mode 208. Information may also be given different priority levels on military flights when compared to commercial flights.

Once the priority information is checked at 212, the highest priority information is assigned bandwidth at 214. This high priority information may be assigned maximum bandwidth to ensure its transfer. If there is more than one type of information or data that has a high priority, then bandwidth may be divided equally amongst them at 214. After bandwidth is allocated to the highest priority information the method shifts to the next priority level and divides the rest of the bandwidth amongst them at 216. The process continues at 218 with additional bandwidth allocation. An upper cap may be present on the maximum amount of bandwidth to be assigned to each type of information to be transmitted so that the entire bandwidth is not consumed by one data/information unit or so that the entire bandwidth is not entirely consumed. Such an upper cap may be customizable and may be modified by the pilot or technician.

At 220, the flight data determined may be transmitted per the bandwidth assigned at 214, 216, and 218 to a destination server 26 such as the one located at the ground station 28. In this manner, the flight data may be transferred according to the priority level of the flight data, with the highest priority data being transmitted first. The transmitting of the determined portion of the flight data is affected by the priority level associated with the flight data and the bandwidth of the communication link. Such an allocation may assure that certain information, which is much more valuable than another, may be transferred at 220. Information typically transferred during the critical mode 208 may include but is not limited to audio data from the cockpit, current and predicted trajectory, GPS coordinates, engine information, aircraft damage status, etc.

When it is determined that the aircraft is in an emergency mode 210, the bandwidth may be assigned in a variety of ways including that information may be transmitted according to priorities or independent of priorities. At 230, the priorities are checked and at 232 it may be determined whether the information is to be assigned per priority or not. Whether to assign by priority of not may be dependent on the aircraft systems 20 involved in the change of the mode to the emergency mode as well as the associated priority level, threshold value, tolerance value, and intensity value. For example, if engine failure has caused the shift to the emergency mode then the information may be assigned per priority because it may be likely that the mode may soon shift to the critical mode. If the data is not to be transferred per priority then the bandwidth is divided equally amongst the information to be transferred at 234. If the data is to be transferred per propriety then the highest priority information may be assigned bandwidth at 236. After bandwidth is allocated to the highest priority information process continues at 238 with additional bandwidth allocation. At 240 the flight data determined may be transmitted to a destination server 26 such as the one located at the ground station 28.

If it is determined that priority will be ignored then the method proceeds to 234 where bandwidth is divided equally amongst all information to be sent. At 234 the pilot may have control over the information to be transferred and may deselect certain data that the pilot feels is not required. The division of bandwidth could be modified either through an interface or upon installation. The bandwidth may also be customized to the aircraft and the intended flight. The method 200 also illustrates that the status is checked again at 242. Such an operational status may be checked continuously including that the determination may be made during the entire period of the method 200. Any shift in mode may be monitored and determined and the flight data transmitted may be changed based on such changing modes.

It will be understood that the method of transmitting aircraft flight data is flexible and that the method 200 illustrated is merely for illustrative purposes. For example, in one variation of priority based transmission, the initial bandwidth may be assigned to multiple information types in the top priority. For example, the trajectory and pilot's transcript or audio information may both have priority level 11 and the flight data may be grouped according to priority levels and the bandwidth may be divided equally amongst them. As the priority level associated with the flight data may change with the operational status of the aircraft such a grouping of the flight data according to priority levels may include determining the priority levels of the flight data. Further, the flight data may be grouped according to priority levels such that several priority levels may be grouped together. For example, information having a priority at level 7 and level 11 would be considered as one level and information having priority level of 1, 3, or 5 would be considered as another level. Further, while the assignment of bandwidth described above includes simultaneously sending both high and low priority data it is contemplated that the sequence of transmitting the data may be controlled to send the most important data first and then assign the bandwidth among lower priority information and transmit such information.

Technical effects of the above described embodiments include that aircraft data is associated with an operational state and that such information may be transferred off of the aircraft. More specifically, the embodiments described above determine what flight data should be transferred during a particular operational status of an aircraft and such information may be transferred thus eliminating the need for a black box on the aircraft. Instead, the data may be transferred to available remote or dedicated servers. The embodiments described above provide for a variety of benefits including that such information may then be used to derive statistics for all aircraft problems, emergencies, and crashes Further, information transferred during emergency and critical stages may also be used to prepare necessary equipment, facilities and other repair/maintenance requirements at the airport or nearest landing space. According to the above embodiments the best set of data and information may be transferred based on the operational status of the aircraft and any custom settings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of transmitting aircraft flight data for an aircraft to a destination server via a wireless communication link, the method comprising:

determining an operational status of the aircraft, wherein the operational status includes a normal mode, an emergency mode, a critical mode, and a user-defined mode;

determining a set of flight data to be transmitted based at least in part on the determined operational status of the aircraft, wherein the set of flight data to be transmitted includes: flight recorder data when it is determined the operational status of the aircraft is in the critical mode, at least one of fuel data or navigational data when it is determined the operational status of the aircraft is in the normal mode, at least one of fault data, electrical and power systems data, or propulsion data when it is determined the operational status of the aircraft is in the emergency mode;

assigning a priority value to at least one subset of the flight data based on a set of criteria;

assigning bandwidth to the at least one subset of the flight data based on the priority; and transmitting the at least one subset of flight data over the wireless communication link to the destination server based on the priority value and the bandwidth.

2. The method of claim 1 wherein the set of criteria includes at least one of a set of predetermined priority criteria, or a set of user defined criteria.

3. The method of claim 1 wherein the flight data of the aircraft includes at least one of navigation data, fuel data, audio data, multimedia data, electrical and power systems data, or propulsion data.

4. The method of claim 3 wherein the set of the flight data to be transmitted includes audio data when it is determined that the aircraft is in one of the emergency mode and the critical mode.

5. The method of claim 4 wherein the set of the flight data to be transmitted further includes navigation data when it is determined that the aircraft is in the critical mode.

6. The method of claim 4 wherein the set of the flight data to be transmitted further includes at least one of electrical and power systems data or propulsion data when it is determined that the aircraft is in the emergency mode.

7. The method of claim 3 wherein the set of the flight data to be transmitted includes fuel data when it is determined that the aircraft is in the normal mode.

8. The method of claim 1, wherein the determining the operational status comprises monitoring at least one parameter of the aircraft indicative of the operational status.

9. The method of claim 8, wherein the at least one parameter may include a threshold value and an intensity value.

10. The method of claim 1, transmitting the at least one subset of flight data in an order based on priority values.

11. The method of claim 1, wherein the destination server includes a designated ground station.

12. The method of claim 1, further comprising storing the at least one subset of flight data.

13. A method of transmitting aircraft flight data to a destination via a wireless communication link, comprising:

determining an operational state of an aircraft, wherein operational states include normal, emergency, and critical;

in response to determining the operational state, selecting, based at least in part on the operational state, a set of aircraft flight data to be transmitted, wherein the selecting the set of aircraft flight data to be transmitted includes:

selecting the set of flight data to include at least one of fuel data or navigational data in response to determining the operational state is normal;

selecting the set of flight data to include at least one of fault data, electrical and power systems data, or propulsion data in response to determining the operational state is emergency; and selecting the set of flight data to include flight recorder data in response to determining the operational state is critical;

associating priority levels with flight data included in the set based at least in part on a set of criteria;

assigning bandwidth allocations to flight data included in the set based at least in part on a set of bandwidth criteria, the priority levels, and the operational state; and transmitting flight data included in the set based at least in part on the priority levels and bandwidth allocations.

14. The method of claim 13, further comprising selecting the set of flight data to include at least one of fault data, electrical and power systems data, or propulsion data, in response to determining the operational state is critical.

15. The method of claim 13, wherein the flight recorder data includes at least one of audio data or multimedia data.

16. The method of claim 13, wherein the determining the operational state of the aircraft includes:

determining that the aircraft has experienced a fault; and in response to determining the aircraft has experienced a fault, at least one of comparing data related to the fault to at least one of a threshold or a tolerance, or determining an intensity value of the fault.

17. The method of claim 13, wherein the transmitting flight data included in the set of flight data includes transmitting flight data having a greater priority level before transmitting flight data having a lesser priority level.

* * * * *